US008549341B2

(12) United States Patent
Shahid et al.

(10) Patent No.: US 8,549,341 B2
(45) Date of Patent: Oct. 1, 2013

(54) SYSTEM AND METHOD FOR REDUCING LATENCY ASSOCIATED WITH TIMESTAMPS IN A MULTI-CORE, MULTI-THREADED PROCESSOR (75) Inventors: Ahmed Shahid, San Jose, CA (US); Kaushik Kuila, San Jose, CA (US); David T. Hass, Santa Clara, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 537 days.

(21) Appl. No.: 12/201,689

(22) Filed: Aug. 29, 2008

(65) Prior Publication Data
US 2010/0058101 A1 Mar. 4, 2010

(51) Int. Cl.
*G06F 1/00* (2006.01)

(52) U.S. Cl.
USPC .......................................................... 713/500

(58) Field of Classification Search
USPC .......................................... 713/500; 370/503
See application file for complete search history.

(56) References Cited

U.S. PATENT DOCUMENTS

| | | | |
|---|---|---|---|
| 5,948,055 A | 9/1999 | Pulsipher et al. | |
| 6,061,418 A * | 5/2000 | Hassoun | 377/47 |
| 6,105,053 A | 8/2000 | Kimmel et al. | |
| 6,163,506 A | 12/2000 | Mundy | |
| 6,529,447 B1 * | 3/2003 | Anil et al. | 368/156 |
| 7,209,534 B2 * | 4/2007 | Lewis | 377/47 |
| 7,552,446 B1 | 6/2009 | Sosnovsky et al. | |
| 7,747,725 B2 * | 6/2010 | Williams et al. | 709/223 |
| 2002/0107903 A1 * | 8/2002 | Richter et al. | 709/201 |
| 2003/0023518 A1 | 1/2003 | Spriggs et al. | |
| 2003/0235216 A1 * | 12/2003 | Gustin | 370/509 |
| 2005/0094567 A1 * | 5/2005 | Kannan et al. | 370/241 |
| 2005/0138083 A1 | 6/2005 | Smith-Semedo et al. | |
| 2005/0207387 A1 * | 9/2005 | Middleton et al. | 370/347 |
| 2006/0037027 A1 * | 2/2006 | Carlson et al. | 719/313 |
| 2006/0239300 A1 * | 10/2006 | Hannel et al. | 370/503 |
| 2007/0083813 A1 | 4/2007 | Lui et al. | |
| 2007/0198997 A1 | 8/2007 | Jacops et al. | |
| 2008/0040718 A1 * | 2/2008 | Cloonan et al. | 718/102 |
| 2008/0117938 A1 * | 5/2008 | Erich et al. | 370/503 |
| 2008/0125990 A1 * | 5/2008 | Chang | 702/69 |
| 2008/0240168 A1 * | 10/2008 | Hoffman et al. | 370/516 |
| 2009/0249343 A1 | 10/2009 | Thiyagarajan et al. | 718/102 |
| 2009/0310726 A1 * | 12/2009 | Alankry et al. | 375/359 |

FOREIGN PATENT DOCUMENTS

| | | |
|---|---|---|
| WO | 2009120259 | 10/2009 |
| WO | WO 2010/024855 | 3/2010 |

OTHER PUBLICATIONS

International Search Report and Written Opinion for PCT Application No. PCT/US09/01383 mailed on Apr. 21, 2009.
International Search Report and Written Opinion for PCT Application No. PCT/US09/04657 mailed on Sep. 24, 2009.
Non-Final Office Action dated Jun. 22, 2011 for U.S. Appl. No. 12/055,061.
Final Office Action, dated Jan. 4, 2012, for U.S. Appl. No. 12/055,061, filed Mar. 25, 2008, 10 pages.

* cited by examiner

*Primary Examiner* — Nimesh G Patel
(74) *Attorney, Agent, or Firm* — Sterne, Kessler, Goldstein & Fox PLLC (57) ABSTRACT A system and method are provided for reducing a latency associated with timestamps in a multi-core, multi threaded processor. A processor capable of simultaneously processing a plurality of threads is provided. The processor includes a plurality of cores, a plurality of network interfaces for network communication, and a timer circuit for reducing a latency associated with timestamps used for synchronization of the network communication utilizing a precision time protocol.

20 Claims, 6 Drawing Sheets

SYSTEM AND METHOD FOR REDUCING LATENCY ASSOCIATED WITH TIMESTAMPS IN A MULTI-CORE, MULTI-THREADED PROCESSOR

FIELD OF THE INVENTION

Tire present invention relates to time-stamping packets in processors, and more particularly to high-precision time stamping of network packets in multi-core, multi-threaded processors.

BACKGROUND

The Precision Time Protocol (PTP) is a time-transfer protocol that allows precise synchronization of networks (e.g., Ethernet networks). Typically, accuracy within a few nanoseconds range may be achieved with this protocol when using hardware generated timestamps. Often, this protocol is utilized such that a set of slave devices may determine the offset between time measurements on their clocks and time measurements on a master device.

To date, the use of the PTP time-transfer protocol has been optimized for systems employing single core processors. Latency issues arising from interrupts and memory writes render the implementation of such protocol on other systems inefficient. There is thus a need for addressing these and/or other issues associated with the prior art.

SUMMARY

A system and method are provided for reducing latency associated with timestamps in a multi-core, multi threaded processor. A processor capable of simultaneously processing a plurality of threads is provided. The processor includes a plurality of cores, a plurality of network interfaces for network communication, and a timer circuit for reducing a latency associated with timestamps used for synchronization of the network communication utilizing a precision time protocol.

DETAILED DESCRIPTION

Figure 1:
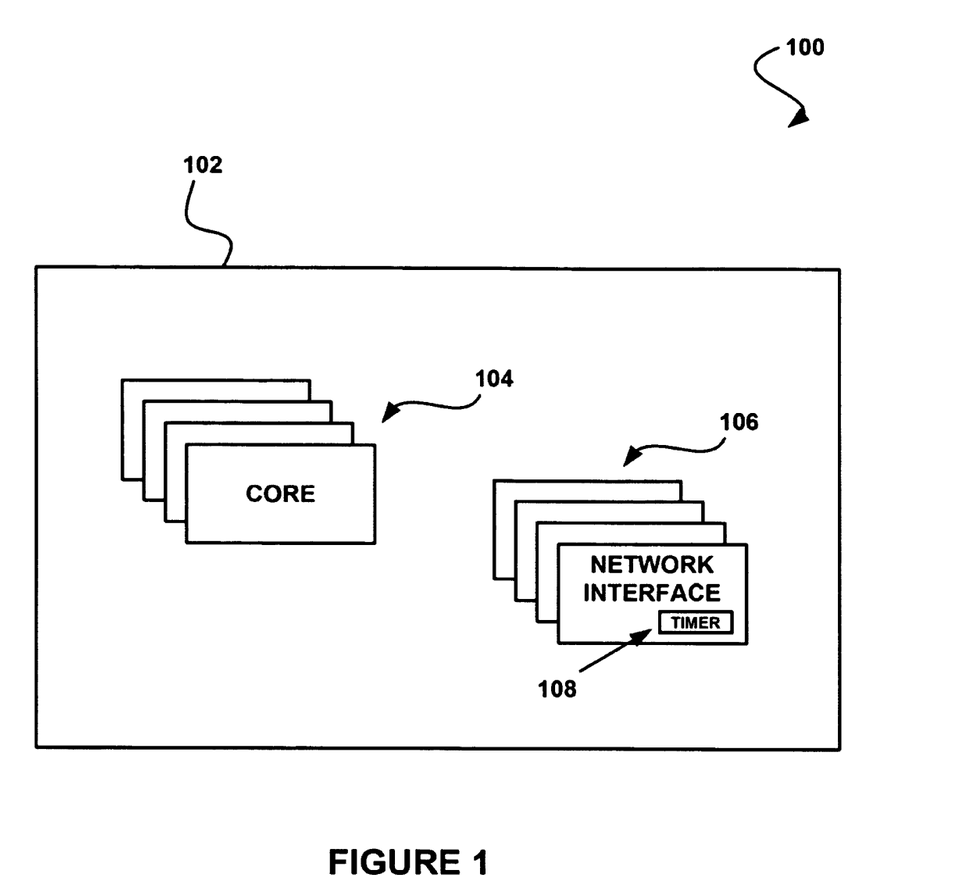
FIG. 1 shows an apparatus for reducing latency associated with timestamps in a multi-core, multi threaded processor, in accordance with one embodiment.

FIG. 1 shows an apparatus 100 for reducing latency associated with timestamps in a multi-core, multi threaded processor, in accordance with one embodiment. As shown, a processor 102 capable of simultaneously processing a plurality of threads is provided. As shown further, the processor includes a plurality of cores 104, a plurality of network interfaces 106 for network communication, and at least one timer circuit 108 for reducing latency associated with timestamps used for synchronization of the network communication utilizing a precision time protocol.

In the context of the present description, a precision time protocol (PTP) refers to a time-transfer protocol that allows precise synchronization of networks (e.g., Ethernet based networks, wireless networks, etc.). In one embodiment, the precision time protocol may be defined by IEEE 1588.

Furthermore, the latency associated with the timestamps may include memory latency and/or interrupt latency. In this case, reducing the latency may include reducing the latency with respect to conventional processor systems. In one embodiment, the interrupt latency may be reduced or eliminated by avoiding the use of interrupts.

In another embodiment, the memory latency may be reduced or eliminated by avoiding the writing of timestamps to memory. In this case, the writing of timestamps to memory may be avoided by directly transferring the timestamps between the plurality of cores 104 and the plurality of network interfaces 106.

In one embodiment, the cores 104 may each be capable of generating a precision time protocol packet including one of the timestamps. In this case, the cores 104 may each be capable of generating a precision time protocol packet including one of the timestamps, utilizing a single register write. Additionally, a precision time protocol packet including one of the timestamps may be capable of being processed by any selected one of the cores 104. Furthermore, any of the cores 104 may be capable of managing any of the network interfaces 106.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
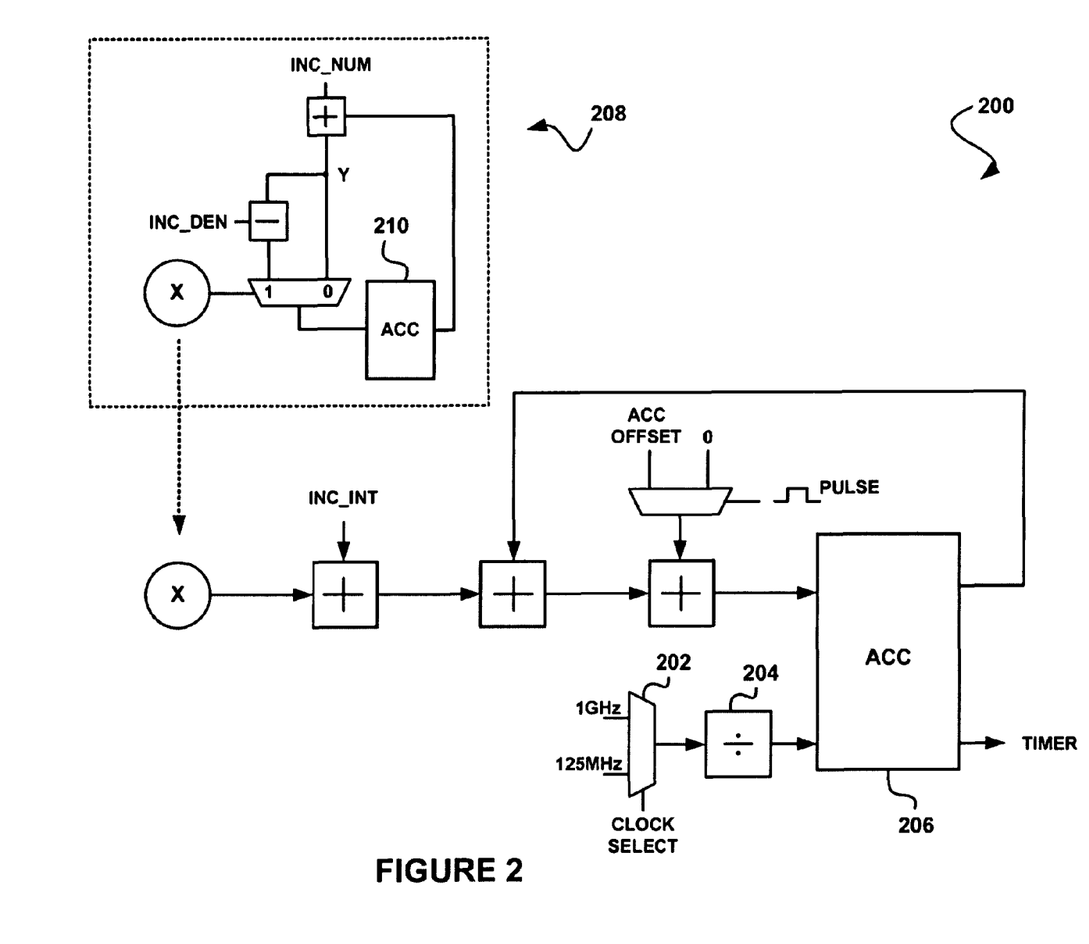
FIG. 2 shows a timer circuit for reducing latency associated with timestamps in a multi-core, multi threaded processor, in accordance with one embodiment.

FIG. 2 shows a timer circuit 200 for increasing precision and reducing latency associated with timestamps in a multi-core, multi threaded processor, in accordance with one embodiment. As an option, the timer circuit 200 may be implemented in the context of the functionality of FIG. 1. Of course, however, the timer circuit 200 may be implemented in any desired environment. It should also be noted that the aforementioned definitions may apply during the present description.

As shown, two clock signals (e.g. a 1 GHz CPU clock signal and a 125 MHz reference clock signal) are input into a first multiplexer 202. A clock select signal is used to select one of the CPU clock signal and the reference clock signal. The clock signal output from the first multiplexer 202 is input into a programmable clock divider 204, which is utilized to determine a frequency for updating a first accumulating unit 206. Thus, the programmable clock divider 204 receives the clock signal and divides the clock signal by a user programmable ratio such that the first accumulating unit 206 and an increment value generation portion 208 of the circuit 200 may utilize the divided clock signal as an input clock signal.

In operation, the increment value generation portion 208 generates an increment value that is summed with an output of the first accumulating unit 206. The increment value generation portion 208 includes a second accumulating unit 210.

For every clock cycle where a value "A" being tracked by the second accumulating unit 210 is less than a denominator value ("Inc_Den") defined by the programmable clock divider 204, a numerator value ("Inc_Num") defined by the programmable clock divider 204 is added to the value being tracked using the second accumulating unit 210. The moment a value "Y" becomes greater than or equal to the denominator value "Inc_Den," an output "X" becomes 1 and the 1 is summed with an integer value "Inc_Int" defined by the programmable clock divider 204, which produces an total increment value that is summed with an output of the first accumulating unit 206 and added to a register of the first accumulating unit 206 every clock cycle. In cycles where "X" is zero, the total increment value is equal to "Inc_Int."

Furthermore, an offset value "ACC Offset" is added to the register of the first accumulating unit 206 whenever the register is written to by software. As an option, this offset value may be utilized to adjust the value of an output of the timer circuit 200. For example, the offset value may be used to automatically synchronize different devices (e.g. a master device and a slave device, etc.). In one embodiment, this offset value may be provided by an offset sub-circuit.

In this way, the programmable clock divider 204 may be programmed with a ratio "a/b" that may be used to determine a precision of synchronization. For example, the clock divider 204 may be programmed with a value of ⅔, where "Inc_Num" is equal to 2 and "Inc_Den" is equal to 3 in this case. For this example, the increment value generation portion 208 will generate the values as shown in Table 1, where the value of the second accumulator 210 is equal a Y value of a previous clock cycle if the Y value of the current clock cycle is less than 3, and equal to the Y value of the previous clock cycle minus 3 when the Y value of the current clock cycle is greater than or equal to 3.

TABLE 1

|  | Clock Cycle Number | | | | |
|---|---|---|---|---|---|
|  | 1 | 2 | 3 | 4 | 5 |
| Second Accumulator Value | 0 | 2 | 1 | 0 | 2 |
| Y | 2 | 4 | 3 | 2 | 4 |
| X | 0 | 1 | 0 | 1 | 1 |

The output "X" is summed with an output of the first accumulating unit 206 and added to a register of the first accumulating unit 206 every clock cycle. Furthermore, an offset value "ACC Offset" may be added to the register of the first accumulating unit 206 whenever the register is written to by software. In the case that a/b is equal to ⅔ (i.e. 1 and ⅔), "Inc_Num" is equal to 2, "Inc_Den" is equal to 3, and "Inc_Int" is equal to 1. Thus, the output "X" will be the same as illustrated in Table 1. The output "X" is then summed with "Inc_Int," or 1 in this case, the output of the first accumulating unit 206, and then added to a register of the first accumulating unit 206 every clock cycle.

Table 2 shows logic associated with the increment value generation portion 208, in accordance with one embodiment.

TABLE 2

```
if (y >= Inc_Den)
    X = 1;
else
    X = 0;
```

Ultimately, when the programmable timer 200 is programmed with a ratio "a/b," where "a" is less than "b," the value of "a" is added to the first accumulating unit 206 every "b" number of clock cycles. When the programmable timer 200 is programmed with a ratio "a/b" where "a" is greater than "b," "a/b" may be viewed as "c+(a1/b1)," and a value of "a1" is added to the first accumulating unit 206 every "b1" number of clock cycles and "c" is added to the first accumulating unit 206 every clock cycle. In other words, when the programmable timer 200 is programmed with a ratio "a/b," where "a" is less than "b," "a/b" corresponds to "Inc_Num/Inc_Den." When the programmable timer 200 is programmed with a ratio "a/b," where "a" is greater than "b," "a/b" corresponds to "c+(a1/b1)," or "Inc_Int+(Inc_Num/Inc_Den)." The programmable clock divider 204 is present to reduce the incoming high frequency clock to lower frequency for reducing power consumption. However, the precision of the clock circuit 200 is still quite high because it allows the clock increment value to be any number that can be represented by "a/b."

Thus, for every clock cycle, "Inc_Int" is added to the first accumulating unit 206. Additionally, for every "Inc_Den" number of clock cycles, "Inc_Num" is added to the first accumulating unit 206. As noted above, the increment value generation portion 208 is utilized to determine the "Inc_Den" number of clock cycles and when "Inc_Num" is to be added to the first accumulating unit 206. Accordingly, the programmable clock timer 200 may be programmed with any proper or improper fraction such that the first accumulating unit 206 increments utilizing that value.

The output of the first accumulating unit 206 may then be used as the timer circuit output. Thus, the timer circuit clock accuracy may be established based on this programmable value. In this way, a source clock may be slower than an effective timer. Accordingly, the programmable timer circuit 200, fed by a plurality of clock frequency sources, may be utilized for synchronization of network communication across each of a plurality of network interfaces.

Figure 3:
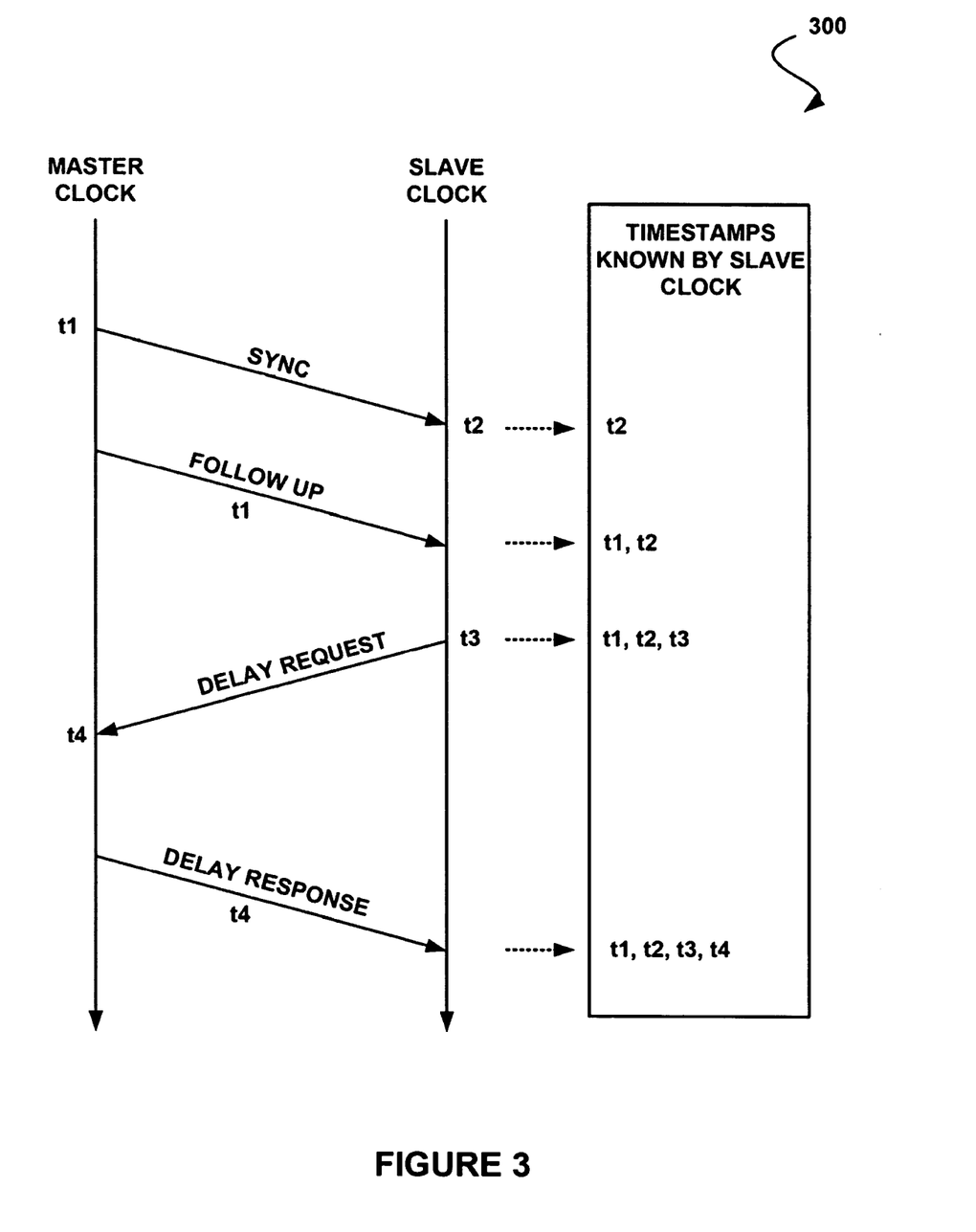
FIG. 3 shows a timing diagram for synchronizing a clock of a slave device with a clock of a master device, in accordance with one embodiment.

It should be noted that, in one embodiment, the first accumulating unit 206 and/or the second accumulating unit 210 may represent a clocking mechanism for IEEE 1588 timers. FIG. 3 shows a timing diagram 300 for synchronizing a clock of a slave device with a clock of a master device, in accordance with one embodiment. As an option, the timing diagram 300 may be implemented in the context of the functionality of FIGS. 1-2. Of course, however, the timing diagram 300 may be implemented in any desired environment. Again, the aforementioned definitions may apply during the present description.

As shown, a master device sends a synchronization message to a slave device. The master device samples the precise time (t1) when the message left the interface. The slave device then receives this synchronization message and records the precise time (t2) that the message was received.

The master device then sends a follow up message including the precise time when the synchronization message left the master device interface. The slave device then sends a delay request message to the master. The slave device also samples the time (t3) when this message left the interface.

The master device then samples the exact time (t4) when it receives the delay request message. A delay response message including this time is then sent to the slave device. The slave device then uses t1, t2, t3, and t4 to synchronize the slave clock with the clock of the master device.

Figure 4:
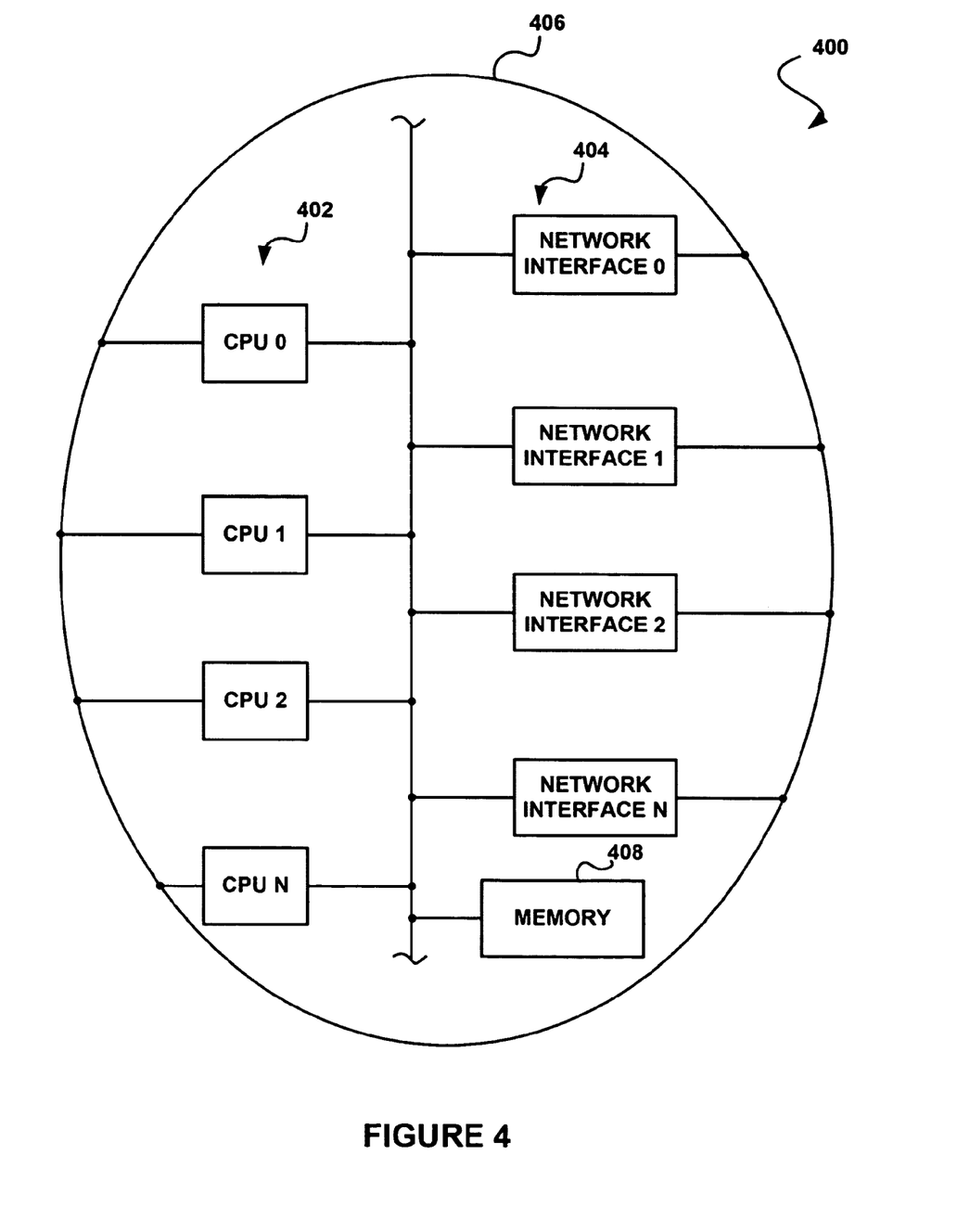
FIG. 4 shows a system for reducing latency associated with timestamps in a multi-core, multi threaded processor, in accordance with another embodiment.

FIG. 4 shows a system 400 for reducing latency associated with timestamps in a multi-core, multi threaded processor, in accordance with another embodiment. As an option, the system 400 may be implemented in the context of the functionality of FIGS. 1-3. Of course, however, the system 400 may be implemented in any desired environment. Further, the aforementioned definitions may apply during the present description.

As shown, the system 400 includes a plurality of central processing units (CPUs) 402 and a plurality of network interfaces 404. The CPUs 402 and the network interfaces 404 are capable of communicating over a fast messaging network (FMN) 406. All components on the FMN 406 may communicate directly with any other components on the FMN 406.

For example, any one of the plurality of CPUs 402 may communicate timestamps directly to any one of the network interfaces 404 utilizing the FMN 406. Similarly, any one of the plurality of network interfaces 404 may communicate timestamps directly to any one of the CPUs 402 utilizing the FMN 406. In this way, a memory latency introduced by writing the timestamps to memory before communicating the timestamps between a CPU and network interface may be avoided. Furthermore, by transferring the timestamps directly between the CPUs 402 and the network interfaces 404 utilizing the FMN 406, the use of interrupts may be avoided.

For example, one of the network interfaces 404 may receive a packet, write the packet to memory 408, generate a descriptor including address, length, status, and control information, and forward the descriptor to one of the CPUs 402 over the FMN 406. In this case, a timestamp generated at the network interface 404 may also be included in the descriptor sent to one of the CPUs 402 over the FMN 406. Thus, any memory latency that would occur from writing the timestamp to memory is avoided. Furthermore, because the CPU 402 receives the packet information and the timestamp as part of the descriptor, the CPU 402 is not interrupted from any processing. Thus, interrupts may be avoided by utilizing transferring the timestamp directly over the FMN 406. Furthermore, avoiding interrupts enables the master device to simultaneously attempt synchronization of timestamps with a plurality of slave devices, thereby reducing latency in achieving network-wide timer synchronization.

In one embodiment, a unique descriptor format for PTP packets (e.g. PTP 1588) may be utilized that allows the CPUs 402 to construct and transmit PTP packets with a single register write. In other words, each of the cores may be capable of generating a precision time protocol packet including one of the timestamps utilizing a single register write.

For example, a descriptor may be designated as an IEEE 1588 format, and may include address, length, status, and control information. This descriptor may be sent from any of the CPUs 402 to any of the network interfaces 404 and cause an IEEE1588 format packet to be generated and transmitted. The network interface 404 may then capture a timestamp corresponding to the IEEE 1588 packet exiting the network interface 404 and return a follow up descriptor with the captured timestamp to the CPU 402 utilizing the FMN 406. Thus, interrupt and memory latency may be avoided. Further, multiple IEEE 1588 packets may be generated by a plurality of CPUs and sent to multiple networking interfaces, in parallel, thereby allowing for timer synchronization with multiple slave devices, simultaneously.

It should be noted that any of the network interfaces 404 may utilize any of the CPUs 402 to process a timestamp. Thus, single or multiple time clock masters may be utilized on a per network interface basis. Furthermore, any of the cores may be capable managing any of the network interfaces 404. Additionally, the network interfaces 404 may include a master network interface and a slave network interface In one embodiment, a free back ID may be included in the descriptor. In this case, the free back ID may be used to define a CPU or thread to route a descriptor and an included timestamp when the descriptor is being sent from one of the network interfaces 404. In this way, the free back ID may allow a captured timestamp to be routed to any CPU and/or thread in a multi-core, multi-threaded processor.

It should be noted that any number of CPUs 402 and any number of network interfaces 404 may be utilized. For example, in various embodiments, 8, 16, 32, or more CPUs may be utilized. As an option, the CPUs may include one or more virtual CPUs.

Figure 5:
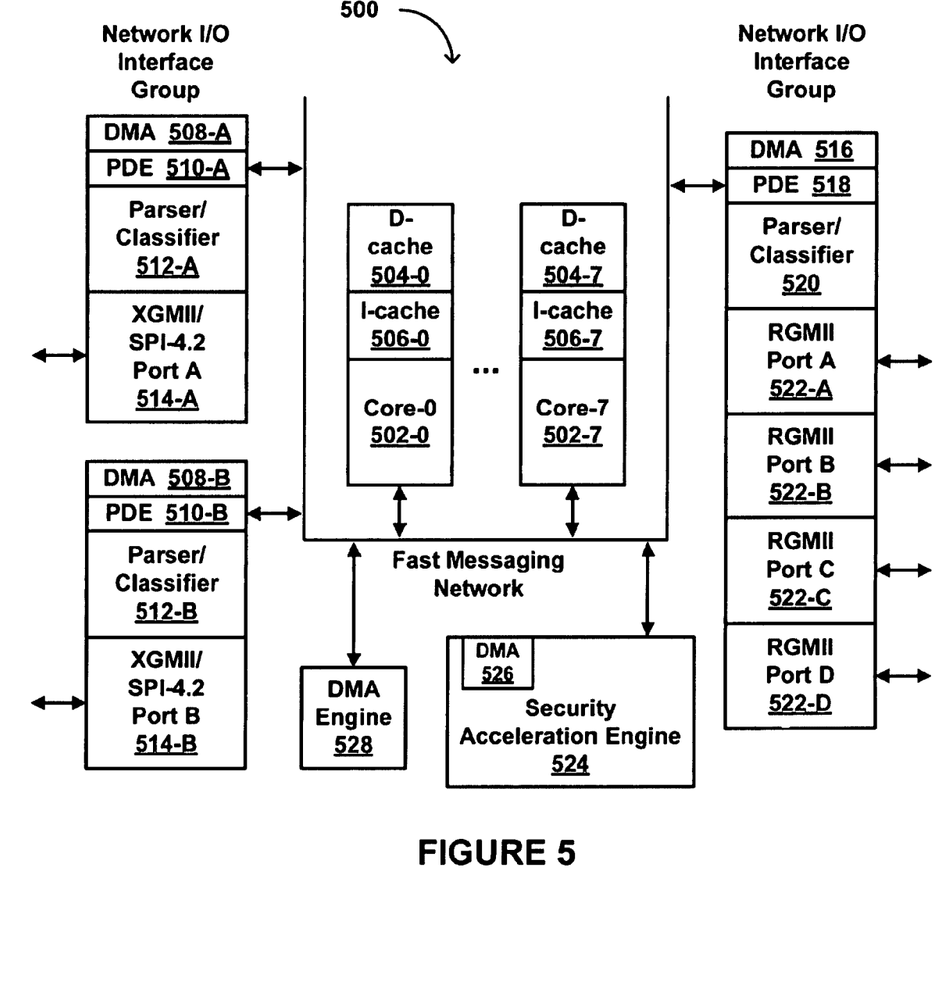
FIG. 5 shows a system illustrating various agents attached to a fast messaging network (FMN), in accordance with one embodiment.

FIG. 5 shows a system 500 illustrating various agents attached to a fast messaging network (FMN), in accordance with one embodiment. As an option, the present system 500 may be implemented in the context of the functionality and architecture of FIGS. 1-4. Of course, however, the system 500 may be implemented in any desired environment. Again, the aforementioned definitions may apply during the present description.

As shown, eight cores (Core-0 502-0 through Core-7 502-7) along with associated data caches (D-cache 504-0 through 504-7) and instruction caches (I-cache 506-0 through 506-7) may interface to an FMN. Further, Network I/O Interface Groups can also interface to the FMN. Associated with a Port A, a DMA 508-A, a Parser/Classifier 512-A, and an XGMII/SPI-4.2 Port A 514-A can interface to the FMN through a Packet Distribution Engine (PDE) 510-A. Similarly, for a Port B, a DMA 508-B, a Parser/Classifier 512-B, and an XGMII/SPI-4.2 Port B 514-B can interface to the FMN through a PDE 510-B. Also, a DMA 516, a Parser/Classifier 520, an RGMII Port A 522-A, an RGMII Port B 522-B, an RGMII Port C 522-C, and an RGMII Port D 522-D can interface to the FMN through a PDE 518. Also, a Security Acceleration Engine 524 including a DMA 526 and a DMA Engine 528 can interface to the FMN.

In one embodiment, all agents (e.g. cores/threads or networking interfaces, such as shown in FIG. 5) on the FMN can send a message to any other agent on the FMN. This structure can allow for fast packet movement among the agents, but software can alter the use of the messaging system for any other appropriate purpose by so defining the syntax and semantics of the message container. In any event, each agent on the FMN may include a transmit queue and a receive queue. Accordingly, messages intended for a particular agent can be dropped into the associated receive queue. All messages originating from a particular agent can be entered into the associated transmit queue and subsequently pushed on the FMN for delivery to the intended recipient.

In another aspect of embodiments of the invention, all threads of the core (e.g., Core-0 502-0 through Core-7 502-7) can share the queue resources. In order to ensure fairness in sending out messages, a "round-robin" scheme may be implemented for accepting messages into the transmit queue. This can guarantee that all threads have the ability to send out messages even when one of them is issuing messages at a faster rate. Accordingly, it is possible that a given transmit queue may be full at the time a message is issued. In such a case, all threads may be allowed to queue up one message each inside the core until the transmit queue has room to accept more messages. Further, the networking interfaces may use the PDE to distribute incoming packets to the designated threads. Further, outgoing packets for the networking interfaces may be routed through packet ordering software.

As an example of one implementation of the system 500, packets may be received by a network interface. The network interface may include any network interface. For example, in various embodiments, the network interface may include a Gigabit Media Independent Interface (GMII), a Reduced Gigabit Media Independent Interface (RGMII), or any other network interface.

When the network interface begins to receive a packet, the network interface stores the packet data in memory, and notifies software of the arrival of the packet, along with a notification of the location of the packet in memory. In this case, the storing and the notification may be performed automatically by the network interface, based on parameters set up by software.

In one embodiment, storing the packet may include allocating memory buffers to store the packet. For example, as packet data arrives, a DMA may consume preallocated memory buffers and store packet data in memory. As an option, the notification of the arrival of the packet may include deciding which thread of a plurality of CPUs should be notified of the arrival.

In one embodiment, the incoming packet data may be parsed and classified. Based on this classification, a recipient thread may be selected from a pool of candidate recipient threads that are designed to handle packets of this kind. A message may then be sent via the FMN to the designated thread announcing its arrival. By providing a flexible feedback mechanism from the recipient thread, the networking interfaces may achieve load balancing across a set of threads.

A single FMN message may contain a plurality of packet descriptors. Additional FMN messages may be generated as desired to represent long packets. In one embodiment, packet descriptors may contain address data, packet length, and port of origin data. One packet descriptor format may include a pointer to the packet data stored in memory. In another case, a packet descriptor format may include a pointer to an array of packet descriptors, allowing for packets of virtually unlimited size to be represented.

As an option, a bit field may indicate the last packet descriptor in a sequence. Using packet descriptors, network accelerators and threads may send and receive packets, create new packets, forward packets to other threads, or any device, such as a network interface for transmission. When a packet is finally consumed, such as at the transmitting networking interface, the exhausted packet buffer may be returned to the originating interface so it can be reused.

In one embodiment, facilities may exist to return freed packet descriptors back to their origin across the FMN without thread intervention. Although, FMN messages may be transmitted in packet descriptor format, the FMN may be implemented as a general purpose message-passing system that can be used by threads to communicate arbitrary information among them.

In another implementation, at system start-up, software may provide all network interfaces with lists of fixed-size pre-allocated memory called packet buffers to store incoming packet data. Pointers may then be encapsulated to the packet buffers in packet descriptors, and sent via the FMN to the various network interfaces.

Each interface may contain a Free-In Descriptor FIFO used to queue up these descriptors. Each of these FIFOs may correspond to a bucket on the FMN. At startup, initialization software may populate these FIFOs with free packet descriptors. In one embodiment, the Free-In Descriptor FIFO may hold a fixed number of packet descriptors on-chip (e.g. 128, 256, etc.) and be extended into memory using a "spill" mechanism.

For example, when a FIFO fills up, spill regions in memory may be utilized to store subsequent descriptors. These spill regions may be made large enough to hold all descriptors necessary for a specific interface. As an option, the spill regions holding the free packet descriptors may also be cached.

When a packet comes in through the receive side of the network interfaces, a free packet descriptor may be popped from the Free-In Descriptor FIFO. The memory address pointer in the descriptor may then be passed to a DMA engine which starts sending the packet data to a memory subsystem. As many additional packet descriptors may be popped from the Free-In Descriptor FIFO as are utilized to store the entire packet. In this case, the last packet descriptor may have an end-of-packet bit set.

In various embodiments, the packet descriptor may include different formats. For example, in one embodiment, a receive packet descriptor format may be used by the ingress side of network interfaces to pass pointers to packet buffers and other useful information to threads.

In another embodiment, a P2D type packet descriptor may be used by the egress side of network interfaces to access pointers to packet buffers to be transmitted. In this case, the P2D packet descriptors may contain the physical address location from which the transmitting DMA engine of the transmitting network interface will read packet data to be transmitted. As an option, the physical address may be byte-aligned or cache-line aligned. Additionally, a length field may be included within P2D Descriptors which describes the length of useful packet data in bytes.

In still another embodiment, a P2P type descriptor may be used by the egress side of network interfaces to access packet data of virtually unlimited size. The P2P type descriptors may allow FMN messages to convey a virtually unlimited number of P2D type descriptors. As an option, the physical address field specified in the P2P type descriptor may resolve to the address of a table of P2D type descriptors. In other embodiments, a free back descriptor may be used by the network interfaces to indicate completion of packet processing and a free in descriptor may be sent from threads during initialization to populate the various descriptor FIFOs with free packet descriptors.

In one embodiment, four P2D packet descriptors may be used to describe the packet data to be sent. For example, a descriptor "A1" may contain a byte-aligned address which specifies the physical memory location containing the packet data used for constructing the packet to be transmitted, a total of four of which comprise the entire packet. The byte-aligned length and byte-aligned address fields in each packet descriptor may be used to characterize the four components of the packet data to be transmitted. Furthermore, a descriptor "A4" may have an EOP bit set to signify that this is the last descriptor for this packet.

Since P2D packets can represent multiple components of a packet, packet data need not be contiguous. For example, a descriptor "A1" may address a buffer containing an Authentication Header (AH) and Encapsulating Security Protocol (ESP) readers, which may be the first chunk of data needed to build up the packet. Likewise, the second chunk of data required is likely the payload data, addressed by a descriptor "A2." The ESP authentication data and ESP trailer are the last chunk of data needed to build the packet, and so may be pointed to by a last descriptor "A3," which also has the EOP bit set signifying that this is the last chunk of data being used to form the packet. In a similar manner, other fields, such as VLAN tags, could be inserted into packets by using the byte-addressable pointers available in the P2D descriptors.

Figure 6:
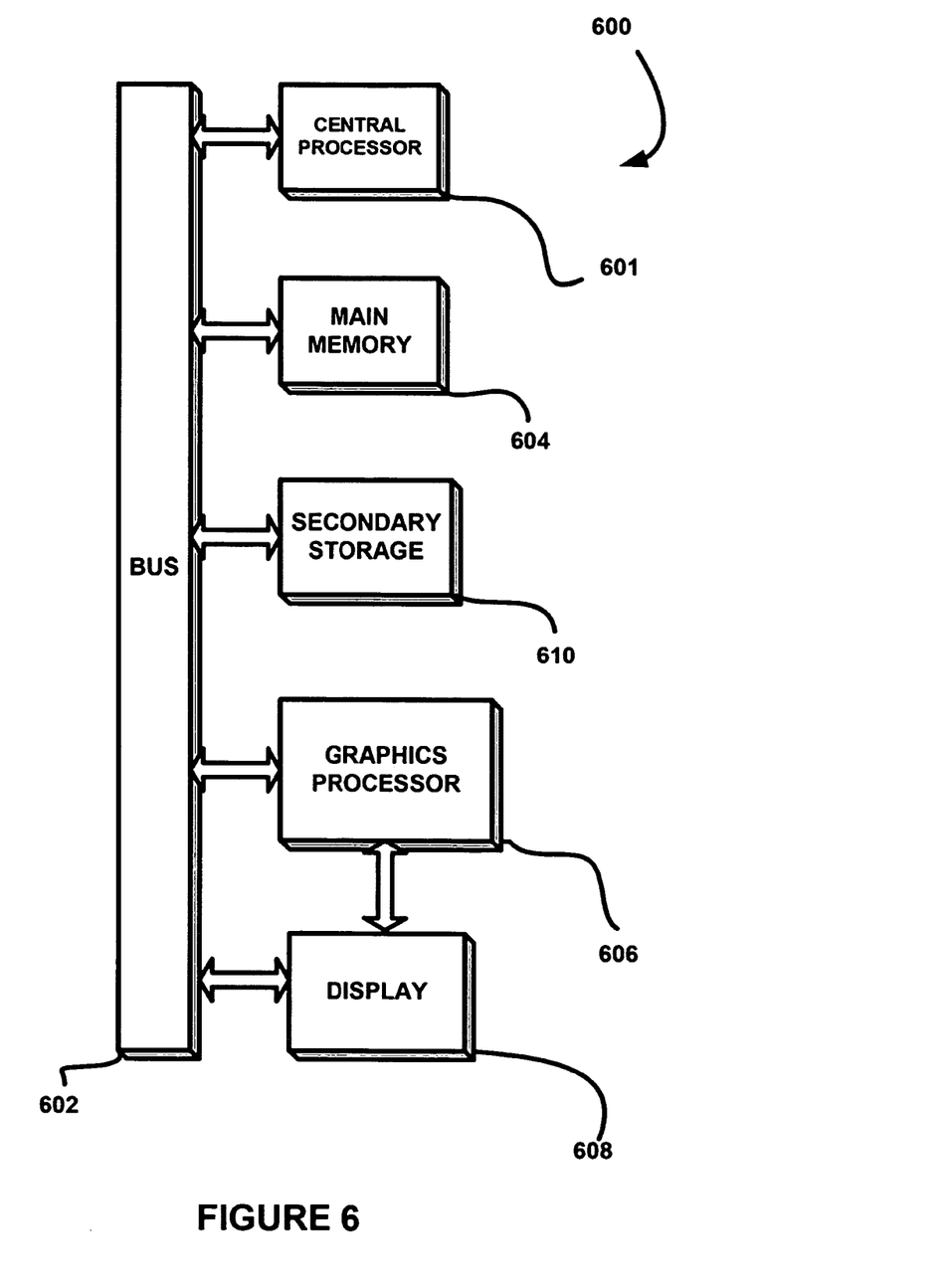
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 may also include a main memory 604. Control logic (software) and data may be stored in the main memory 604 which may take the form of random access memory (RAM).

The system 600 may also include a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to, a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a processor configured to process a plurality of threads, the processor including:
a plurality of cores,
a plurality of network interfaces for network communication, and
a timer circuit corresponding to at least one of the plurality of cores to reduce a latency associated with timestamps used for synchronization of the network communication, in which the at least one of the plurality of cores, by using the timer circuit included within the processor, generates and communicates the timestamps directly from the at least one of the plurality of cores to at least one of the plurality of network interfaces.

2. The apparatus of claim 1, wherein the latency includes memory latency.

3. The apparatus of claim 1, wherein the latency includes interrupt latency.

4. The apparatus of claim 3, wherein the interrupt latency is eliminated by avoiding use of interrupts.

5. The apparatus of claim 1, wherein the at least one of the plurality of cores is coupled to a network for communicating the timestamps.

6. The apparatus of claim 1, wherein the timer circuit is configured to utilize a time-transfer protocol defined by IEEE 1588.

7. The apparatus of claim 1, wherein the timer circuit is programmable.

8. The apparatus of claim 1, wherein the timer circuit is fed by a plurality of clock frequency sources.

9. The apparatus of claim 1, wherein the timer circuit includes a divider, a multiplier, and an offset sub-circuit.

10. The apparatus of claim 1, wherein the timer circuit is configured to synchronize the network communication across each of the plurality of network interfaces.

11. The apparatus of claim 1, wherein the cores are each configured to generate a precision time protocol packet including one of the timestamps.

12. The apparatus of claim 11, wherein the cores are each configured to generate the precision time protocol packet including one of the timestamps, utilizing a single register write.

13. The apparatus of claim 1, wherein a precision time protocol packet including one of the timestamps is configured to be processed by any selected one of the cores.

14. The apparatus of claim 1, wherein any of the cores is configured to manage any of the network interfaces.

15. The apparatus of claim 1, wherein the network interfaces include a master network interface and a slave network interface.

16. A method of operating a processor including a plurality of cores and a plurality of network interfaces, the method comprising:
utilizing a timer circuit corresponding to at least one of the plurality of cores to reduce a latency associated with timestamps used for synchronization of network communication, in which the at least one of the plurality of cores, by using the timer circuit included within the processor, generates and communicates the timestamps directly from the at least one of the plurality of cores to at least one of the plurality of network interfaces; and
transferring the timestamps between the plurality of cores and the plurality of network interfaces.

17. The method of claim 16, wherein the latency includes memory latency.

18. The method of claim 16, wherein the latency includes interrupt latency.

19. The method of claim 18, wherein the interrupt latency is eliminated by avoiding use of interrupts.

20. The method of claim 16, wherein the at least one of the plurality of cores is coupled to a network for communicating the timestamps.

* * * * *